(12) United States Patent
Baker

(10) Patent No.: US 10,641,363 B2
(45) Date of Patent: May 5, 2020

(54) DISENGAGEMENT MECHANISM FOR A WALK BEHIND MOWER

(71) Applicant: HUSQVARNA AB, Huskvarna (SE)

(72) Inventor: David Baker, Fort Lawn, SC (US)

(73) Assignee: HUSQVARNA AB, Huskvarna (SE)

( * ) Notice: Subject to any disclaimer, the term of this patent is extended or adjusted under 35 U.S.C. 154(b) by 101 days.

(21) Appl. No.: 15/773,353

(22) PCT Filed: Nov. 1, 2016

(86) PCT No.: PCT/IB2016/056571
§ 371 (c)(1),
(2) Date: May 3, 2018

(87) PCT Pub. No.: WO2017/077450
PCT Pub. Date: May 11, 2017

(65) Prior Publication Data
US 2018/0320762 A1  Nov. 8, 2018

Related U.S. Application Data

(60) Provisional application No. 62/251,393, filed on Nov. 5, 2015.

(51) Int. Cl.
*F16H 7/08* (2006.01)
*A01D 34/68* (2006.01)
(Continued)

(52) U.S. Cl.
CPC ....... *F16H 7/0827* (2013.01); *A01D 34/6806* (2013.01); *A01D 34/6812* (2013.01);
(Continued)

(58) Field of Classification Search
CPC ......... F16H 7/0827; F16H 9/26; A01D 34/68; A01D 34/6806; A01D 34/6812;
(Continued)

(56) References Cited

U.S. PATENT DOCUMENTS 2,708,484 A * 5/1955 Hoffman ............ A01D 34/6806
180/19.1
3,396,809 A * 8/1968 Kortum ............. A01D 34/6806
180/19.3
(Continued)

FOREIGN PATENT DOCUMENTS

FR 2683423 A1 * 5/1993 ............. A01D 34/68
FR 2731313 A1 * 9/1996 ............. A01D 34/68
(Continued)

OTHER PUBLICATIONS

International Search Report and Written Opinion for International Application No. PCT/IB2016/056571 dated Jan. 5, 2017, all enclosed pages cited.
(Continued)

*Primary Examiner* — Ruth Ilan
(74) *Attorney, Agent, or Firm* — Burr & Forman LLP

(57) ABSTRACT

A lawn mower (10) may include a blade housing (20), an engine (30), a mobility assembly (310); and a drive system (300). The engine (30) may be operably coupled to the blade housing (20) and configured to selectively rotate a drive shaft (130). The mobility assembly (310) may include a first set of wheels (40, 42) and be selectively operably coupled to the engine (30) to provide mobility of the lawn mower responsive at least in part to operation of the engine (30). The drive system (300) may include a first transmission (110, 120), a flexible driving member (100), a disengagement assembly (116), and a remote actuator. The a disengagement assembly (116) may include a latching lever (125), where the latching lever (125) is configured to switch the first transmission (110, 120) between a disengaged mode and an engaged mode, and where the latching lever (125) is configured to move between a disengaged position corresponding to the disengaged mode and an engaged position corresponding to the engaged mode. The remote actuator
(Continued)

may be operably coupled to the flexible driving member (100), where responsive to actuation of the remote actuator, the flexible driving member (100) engages a) the latching lever (125) to move the latching lever (125) to the engaged position to thereby place the first transmission (110, 120) in the engaged mode; and b) the first transmission (110, 120) to provide drive power from the drive shaft (130) to the first set of wheels (40, 42).

20 Claims, 6 Drawing Sheets

(51) Int. Cl.
  *A01D 34/69* (2006.01)
  *F16H 9/26* (2006.01)
  *A01D 101/00* (2006.01)
(52) U.S. Cl.
  CPC ............... *A01D 34/69* (2013.01); *F16H 9/26* (2013.01); *A01D 2034/6837* (2013.01); *A01D 2034/6843* (2013.01); *A01D 2101/00* (2013.01)
(58) Field of Classification Search
  CPC .... A01D 2034/6837; A01D 2034/6843; A01D 2101/00
  See application file for complete search history.

(56) References Cited

U.S. PATENT DOCUMENTS

| | | | |
|---|---|---|---|
| 4,176,560 A | 12/1979 | Clarke | |
| 4,835,949 A * | 6/1989 | Seyerle | A01D 34/6806 56/10.8 |
| 4,915,203 A * | 4/1990 | Schweitz | A01D 34/6806 192/48.5 |
| 6,098,385 A * | 8/2000 | Turk | A01D 34/6806 56/11.1 |
| 6,155,033 A * | 12/2000 | Wians | A01D 34/6806 56/11.1 |
| 6,475,109 B2 | 11/2002 | Blanchhard | |
| 9,055,713 B2 * | 6/2015 | Helgesen | A01D 34/81 |
| 9,622,407 B2 * | 4/2017 | Helgesen | A01D 34/6812 |
| 9,730,385 B2 * | 8/2017 | Baker | A01D 34/6806 |
| 2002/0178708 A1 | 12/2002 | Williams et al. | |
| 2006/0021313 A1 | 2/2006 | Keane et al. | |
| 2016/0201771 A1 * | 7/2016 | Wadzinski | F16H 7/0827 74/664 |
| 2017/0367259 A1 * | 12/2017 | Shaffer | A01D 34/6806 |
| 2018/0352737 A1 * | 12/2018 | Helgesen | A01D 34/69 |

FOREIGN PATENT DOCUMENTS

| | | |
|---|---|---|
| FR | 2 801 951 A1 | 6/2001 |
| GB | 2 066 633 A1 | 7/1981 |
| IN | 20120077413 | 11/2013 |
| WO | 2013/122563 A1 | 8/2013 |

OTHER PUBLICATIONS

International Preliminary Report on Patentability for International Application No. PCT/IB2016/056571 dated May 8, 2018, all enclosed pages cited.

* cited by examiner

DISENGAGEMENT MECHANISM FOR A WALK BEHIND MOWER

CROSS-REFERENCE TO RELATED APPLICATIONS

This application claims priority to U.S. application No. 62/251,393 filed Nov. 5, 2015, the entire contents of which are hereby incorporated by reference.

TECHNICAL FIELD

Example embodiments generally relate to outdoor power equipment and, more particularly, relate to a walk behind lawn mower.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically relatively compact, have comparatively small engines and are relatively inexpensive.

Walk behind models are often used when smaller lots or tighter areas are to be mowed. Some, relatively simple walk behind models may move responsive only to the pushing force provided by the operator. However, other models may provide power to the wheels to assist the operator relative to providing mobility for the lawn mower. In many instances, the lawn mower may have power provided to either the front set of wheels, or the rear set of wheels. The power may be provided, for example, via a belt system that is selectively powered off the same shaft that turns a blade for cutting grass.

BRIEF SUMMARY OF SOME EXAMPLES

Some example embodiments may therefore provide a mechanism for walk behind mower that improves mobility of the mower in response to pushing and pulling force provided by the operator.

In one example embodiment, a lawn mower is provided. The lawn mower may include a blade housing, an engine, a mobility assembly; and a drive system. The engine may be operably coupled to the blade housing and configured to selectively rotate a drive shaft. The mobility assembly may include a first set of wheels and be selectively operably coupled to the engine to provide mobility of the lawn mower responsive at least in part to operation of the engine. The drive system may include a first transmission, a flexible driving member, a disengagement assembly, and a remote actuator. The a disengagement assembly may include a latching lever, where the latching lever is configured to switch the first transmission between a disengaged mode and an engaged mode, and where the latching lever is configured to move between a disengaged position corresponding to the disengaged mode and an engaged position corresponding to the engaged mode. The remote actuator may be operably coupled to the flexible driving member, where responsive to actuation of the remote actuator, the flexible driving member engages a) the latching lever to move the latching lever to the engaged position to thereby place the first transmission in the engaged mode; and b) the first transmission to provide drive power from the drive shaft to the first set of wheels.

In another example embodiment, a drive system is provided. The drive system may include a first transmission, a flexible driving member, a disengagement assembly, and a remote actuator. The a disengagement assembly may include a latching lever, where the latching lever is configured to switch the first transmission between a disengaged mode and an engaged mode, and where the latching lever is configured to move between a disengaged position corresponding to the disengaged mode and an engaged position corresponding to the engaged mode. The remote actuator may be operably coupled to the flexible driving member, where responsive to actuation of the remote actuator, the flexible driving member engages a) the latching lever to move the latching lever to the engaged position to thereby place the first transmission in the engaged mode; and b) the first transmission to provide drive power from the drive shaft to the first set of wheels.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
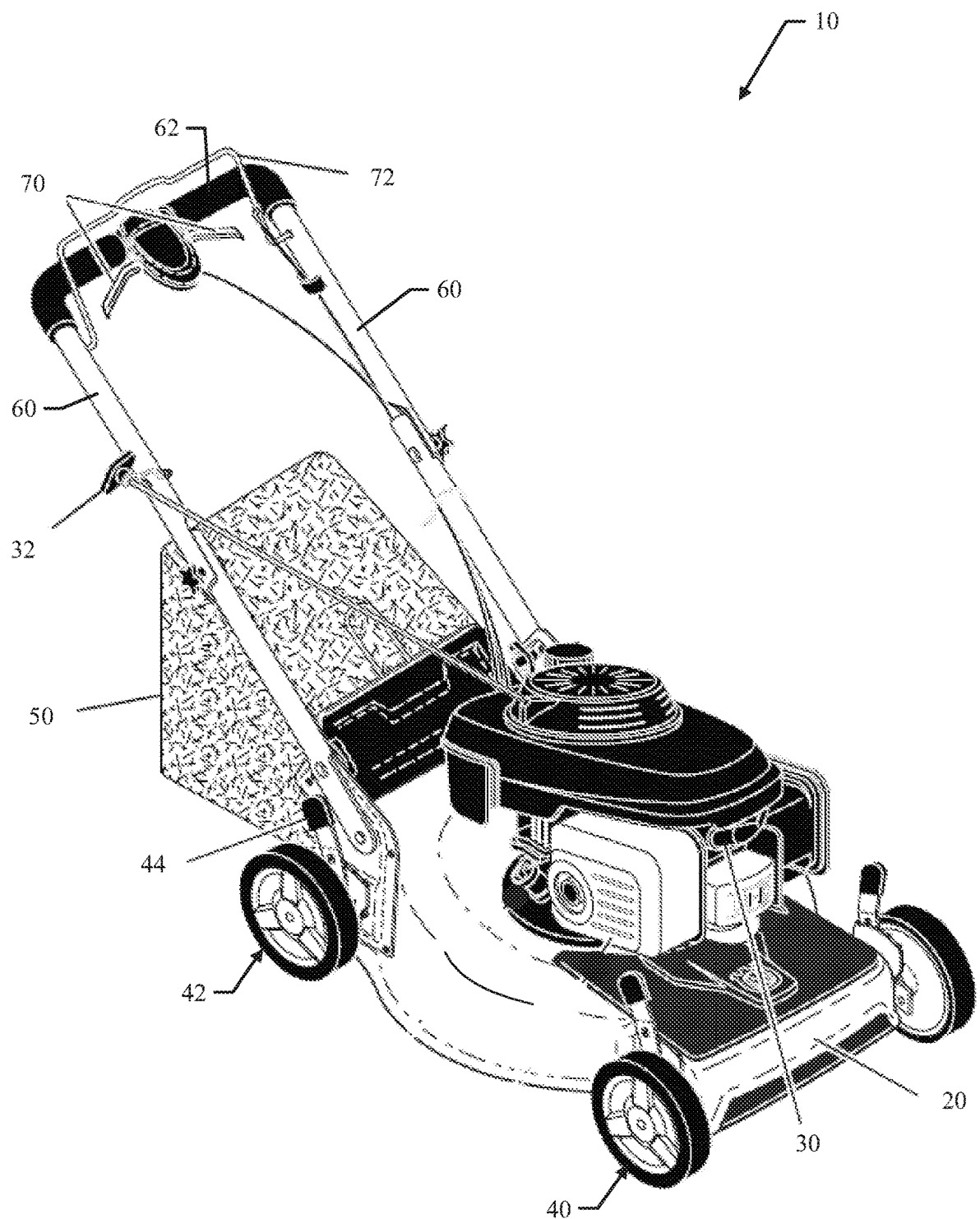
FIG. 1 illustrates a perspective view of a walk-behind lawn mower according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

A walk-behind mower ("mower") may have a first (e.g. front) transmission and second (e.g. rear) transmission that provides power to the first (e.g. front) set of wheels and the second (e.g. rear) set of wheels in order to assist the operator in pushing the mower in a forward direction. Specifically, an operator may pull a remote actuator (e.g. trigger control)

located on the mower to engage a front transmission and a rear transmission so that drive power is provided to a front and rear set of wheels. When the operator wishes to pull the mower in a backwards direction, the operator may pull the trigger control located on the motor to disengage the front transmission and rear transmission. For the front transmission to become disengaged, a transmission shaft needs to rotate approximately 180 degrees. In some instances, the front transmission may not complete the 180 degree rotation, and the front transmission does not disengage. When the front transmission is not disengaged, the front wheels may lock up making it difficult for the operator to move the lawn mower in a backwards direction. For example, when mowing a lawn, an operator may come to a fence and need to reverse the mower in order to continue mowing. The operator may pull a trigger control to reverse the mower, where the trigger control may be configured to disengage the front and rear transmission. However, as the front transmission needs to complete a 180 degree rotation to disengage, the front transmission may not become disengaged. Because the front transmission may not disengage, the front wheels may become locked. When the front wheels are locked, it makes it very difficult for the operator to move the mower backwards.

Some example embodiments described herein provide methods and/or structures for improving the operator's ability to move the mower in a backwards direction. Specifically, a disengagement assembly is provided for engaging and disengaging a front transmission through tensioning and detensioning of a flexible driving member. The disengagement assembly may be operably coupled to a front transmission of a mower to enable the front transmission to 1) provide drive power to the front wheels of a mower when the front transmission is engaged and 2) enable the front wheels to rotate when the front transmission is disengaged.

FIG. 1 illustrates a perspective view of a mower 10 of an example embodiment. The mower 10 of FIG. 1 includes a blade housing 20 that may house a rotatable cutting blade (not shown). The cutting blade may be suspended above the ground at the end of a rotatable shaft (e.g., a drive shaft—again not shown in FIG. 1) that may be turned responsive to operation of an engine 30, such as a gasoline powered engine. Operation of the engine 30 may be initiated by a recoil starter via pulling of a recoil starter handle 32 by the operator. However, in other embodiments, the engine 30 may alternatively be started via a key, switch or other similar device.

The mower 10 may include a mobility assembly 310 on which a substantial portion of the weight of the mower 10 may rest, when the mower 10 is stationary. The mobility assembly 310 may also provide for movement of the mower 10. In some cases, the mobility assembly 310 may be driven via power from the engine 30 that may be selectively provided to either or both of front wheels 40 and rear wheels 42, which make up the mobility assembly 310. However, in some cases, the mobility assembly 310 may simply provide for mobility of the mower 10 responsive to pushing by the operator if, for example, drive power is not being provided to both the front wheels 40 and the rear wheels 42. In other words, for example, the mobility assembly 310 may be an active or passive provider of mobility for the lawn mower 10.

In some examples, the front wheels 40 and/or the rear wheels 42 may be adjustable in their respective heights. Adjusting the height of the front wheels 40 and/or the rear wheels 42 may be employed in order to provide a level cut and/or to adjust the height of the cutting blade. In some embodiments, a local wheel height adjuster 44 may be provided at the front wheels 40 and/or the rear wheels 42. However, in other embodiments, remote wheel height adjustment may also or alternatively be possible.

Rotation of the cutting blade may generate grass clippings, and/or other debris that may be ejected from the blade housing 20. In some cases, the clippings/debris may be ejected from a side or rear of the blade housing 20. When rear discharge is employed, many such lawn mowers may employ a bagging attachment 50 to collect discharged clippings/debris. However, bagging attachments may also be used for side discharge models in some cases. The bagging attachment 50 may be removable to enable the operator to empty the bagging attachment 50.

In an example embodiment, the mower 10 may further include a handle assembly. The handle assembly of FIG. 1 may include two handle members 60 that extend generally rearward and upward from opposing sides of a rear portion of the blade housing 20. The handle members 60 may be substantially parallel to each other and may be connected to each other at their distal ends via a cross bar 62. The handle members 60 may be adjustable in length or may be foldable to reduce the amount of space that the mower 10 consumes when stored or shipped.

In some embodiments, various controls may be provided proximate to the cross bar 62 and/or one or more of the handle members 60. For example, the pictured embodiment shows a trigger controller 70 and a presence bar 72. When the presence bar 72 is held proximate to the cross bar 62, power may be enabled to be delivered to either or both of the front wheels 40 and the rear wheels 42. The trigger controller 70 may be used to provide for remote actuation of various control functions. For example, pulling either or both of the movable members of the trigger controller 70 may cause adjustments to be made to one or more transmissions of the mower 10. As such, the trigger controller 70 provides one example of a remote actuator (or actuation mechanism) that may be employed to practice an example embodiment. In some cases, however, the trigger controller 70 may be replaced by a lever, knob, or other actuation device that may be operably coupled to a speed change gear, one or more transmissions or linkages associated therewith, and/or one or more idler pulleys or linkages associated therewith.

Figure 2:
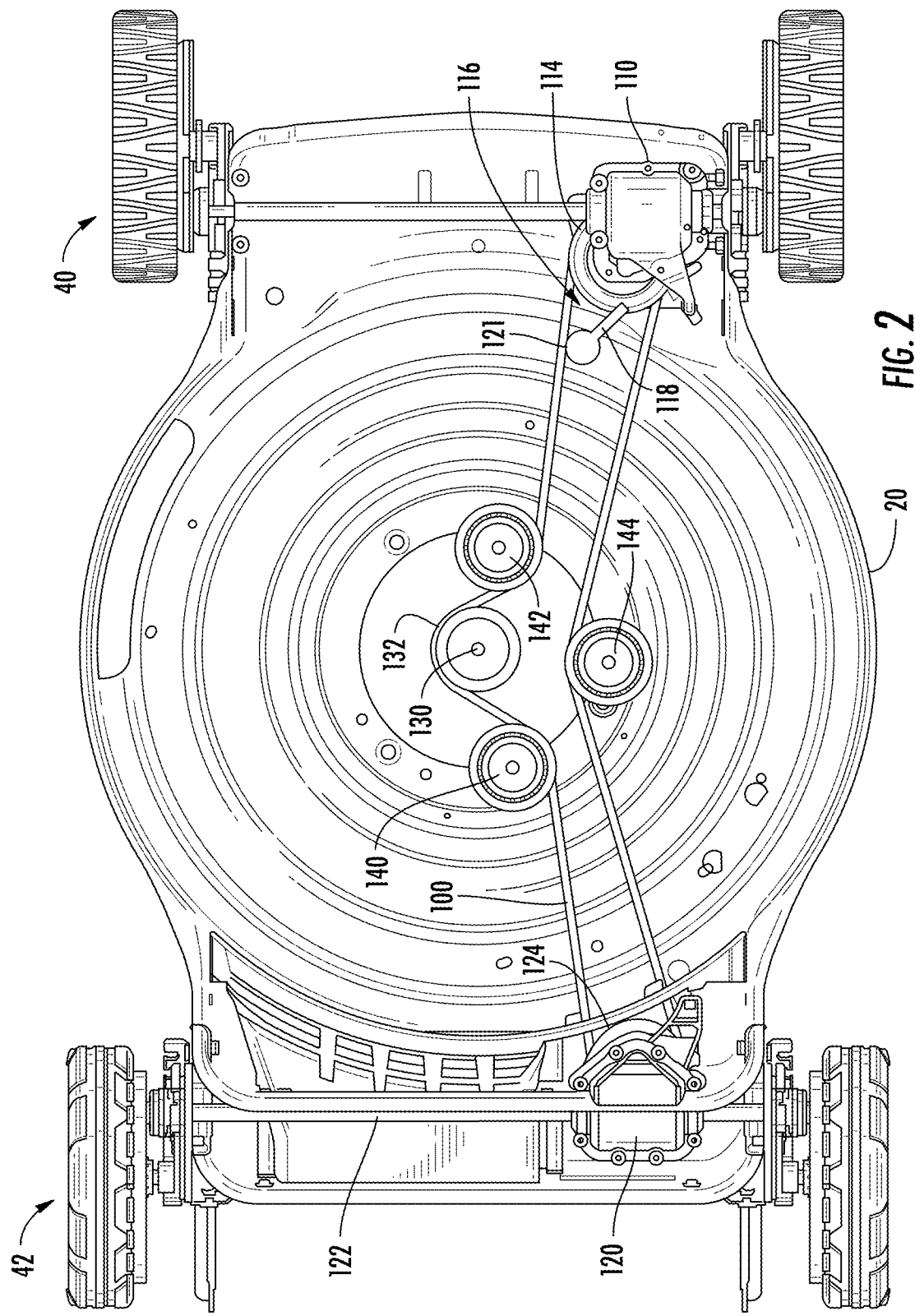
FIG. 2 illustrates a view of portions of a drive system of the lawn mower from below the blade housing of an example embodiment.

FIG. 2 illustrates a view from below the blade housing 20 of an example embodiment employing a single flexible driving member 100. In other words, FIG. 2 is a view from below ground level looking up into the under side of the blade housing 20. As shown in FIG. 2, a flexible driving member 100 may be routed to a front transmission 110, which may be operably coupled via axle 112 to selectively provide power to the front wheels 40. As shown in this example, the flexible driving member 100 may be a single drive belt. However, in further example embodiments, the flexible driving member 100 may include two or multiple drive belts. The front transmission 110 may include a first drive pulley 114 that is capable of engaging the flexible driving member 100 when there is sufficient tension (or lack of slack) between the flexible driving member 100 and the first drive pulley 114. The flexible driving member 100 may be further routed to a rear transmission 120, which may be operably coupled via axle 122 to selectively provide power to turn the rear wheels 42 when the rear transmission 120 is engaged. The rear transmission 120 may include a second drive pulley 124 that is capable of engaging the flexible driving member 100 when there is sufficient tension (or lack of slack) between the flexible driving member 100 and the second drive pulley 124. In some embodiments, the amount of tension (or slack) between the drive pulleys and the flexible driving member 100 may be adjusted remotely for at least one of the drive pulleys.

The flexible driving member 100 may be operably (directly or indirectly) coupled to a drive shaft 130 that turns a blade (not shown) for cutting grass. For example, the drive shaft 130 may rotate responsive to operation of the engine 30 and turn a drive shaft pulley 132 that may be operably coupled to the drive shaft 130. The rotation of the drive shaft pulley 132 may cause corresponding movement of the flexible driving member 100 via engagement between the drive shaft pulley 132 and the flexible driving member 100 based on tension maintained between the drive shaft pulley 132 and the flexible driving member 100. The movement of the flexible driving member 100 may thereafter be selectively transferred to the front transmission 110 and/or the rear transmission 120 via respective ones of the first drive pulley 114 and the second drive pulley 124.

In an example embodiment, one or more idler pulleys (e.g., primary idler pulleys 140 and 142 and secondary idler pulley 144) may be disposed proximate to the drive shaft pulley 132 in order to assist in providing tension between the flexible driving member 100 and the drive shaft pulley 132 and to provide for a desired alignment of the flexible driving member 100 as it engages the drive shaft pulley 132. Although three idler pulleys are shown in FIG. 2, it should be appreciated that either more or fewer idler pulleys may be employed in alternative embodiments. Furthermore, the location of the idler pulleys need not necessarily be the same as that which is shown in FIG. 2.

In the example of FIG. 2, the primary idler pulleys 140 and 142 are disposed substantially on opposite sides of the drive shaft pulley 132 and engage an opposite surface of the flexible driving member 100 than the surface engaged by the drive shaft pulley 132. In this regard, for example, the drive shaft pulley 132 engages an interior surface of the flexible driving member 100, while the primary idler pulleys 140 and 142 engage an exterior surface of the flexible driving member 100 to provide tension or tend to pull the flexible driving member 100 into contact with the drive shaft pulley 132. Meanwhile, the secondary idler pulley 144 is disposed to engage a portion of the flexible driving member 100 that extends between the front transmission 110 and the rear transmission 120. The secondary idler pulley 144 also engages an exterior surface of the flexible driving member 100 in order to tend to pull the flexible driving member 100 into engagement with the other components of the drive system (e.g., the drive shaft pulley 132, the first drive pulley 114 and the second drive pulley 124). Given the configuration shown in FIG. 2, movement of the secondary idler pulley 144 closer toward the drive shaft pulley 132 would tend to tighten the flexible driving member 100. Meanwhile, movement of either or both of the primary idler pulleys 140 and 142 toward the secondary idler pulley 144 would also tend to tighten the flexible driving member 100. In some embodiments, a position of one or more of the idler pulleys may be adjustable in order to adjust the tightness of the flexible driving member 100.

When the flexible driving member 100 has sufficient tension with respect to its engagement with the first drive pulley 114 and the second drive pulley 124, both the front transmission 110 and the rear transmission 120 may be engaged and drive power may be provided to both the front and rear wheels.

Flexible driving member tensioning may be accomplished via a number of different ways. Example embodiments of the present invention may enable the use of a single remote actuator to provide for belt tensioning control. At least in relation to the flexible driving member embodiment shown in FIG. 2, belt tensioning may be controlled at least by enabling movement of an idler pulley to adjust tension of the flexible driving member 100 relative to at least one of the drive pulleys, or by enabling an adjustment of tension via movement of the drive pulley itself. Thus, for example, either the front transmission 110 or the rear transmission 120 may be enabled to be rocked or rotated (e.g., responsive to actuation of the single actuator) to adjust belt tension. Alternatively, one or more idler pulleys may be used to adjust tension of one of the flexible driving members and the idler pulleys may be disposed proximate to the drive shaft pulley 132 or proximate to the first drive pulley 114 or second drive pulley 124.

In an example embodiment, a disengagement assembly 116 may be operably coupled to the front transmission 110. The disengagement assembly 116 may further enable the front transmission 110 to effectively shift between an engaged mode and a disengaged mode in response to tensioning and detensioning of the flexible driving member 100. By further enabling the front transmission 110 to effectively shift between the engaged mode and the disengaged mode, the front transmission 110 may provide drive power to the front wheels 40 when the front transmission 110 is in the engaged mode, assisting the operator in moving the mower 10 in a forward direction. Even further, when the front transmission 110 shifts to the disengaged mode, the front transmission 110 becomes disengaged which allows the front wheels 40 to rotate. When the front wheels 40 are rotatable, the operator may move the mower 10 in a backwards direction with ease.

The disengagement assembly 116 may include a latching lever 125 (see FIGS. 4A-5) and a clutch dog assembly 200 of the front transmission 110. The latching lever 125 may pivot or rotate between an engaged position and a disengaged position to engage and disengage the clutch dog assembly 200 of the front transmission 110. The latching lever 125 may be operably coupled between the front transmission 110 and the flexible driving member 100 in such a way to allow the latching lever 125 to move between the engaged position and disengaged position. The latching lever may include a disengagement arm 118 and a rotatable idler pulley 121. More particularly, the disengagement arm 118 may include a first end and a second end, wherein the first end is operably coupled to the front transmission 110, and the second end is operably coupled to the rotatable idler pulley 121. The disengagement arm 118 may be operably coupled to the rotatable idler pulley 121 and front transmission 110 in such a way to allow the disengagement arm 118 to move between the engaged position and the disengaged position. Even further, the disengagement arm 118 may be any pre-determined length, such that the length selected enables the amount of rotation needed to pivot the disengagement arm 118 to the engaged position and the disengaged position.

Figure 4A:
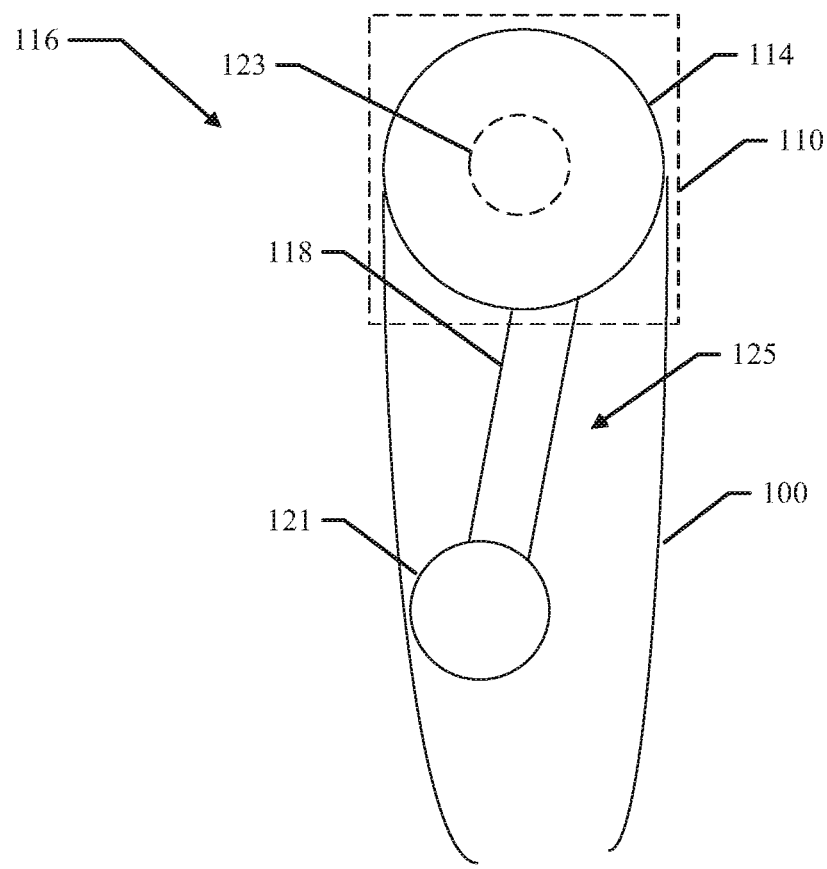
FIG. 4A illustrates a perspective view of a disengagement mechanism in an engaged mode according to an example embodiment.
Figure 4B:
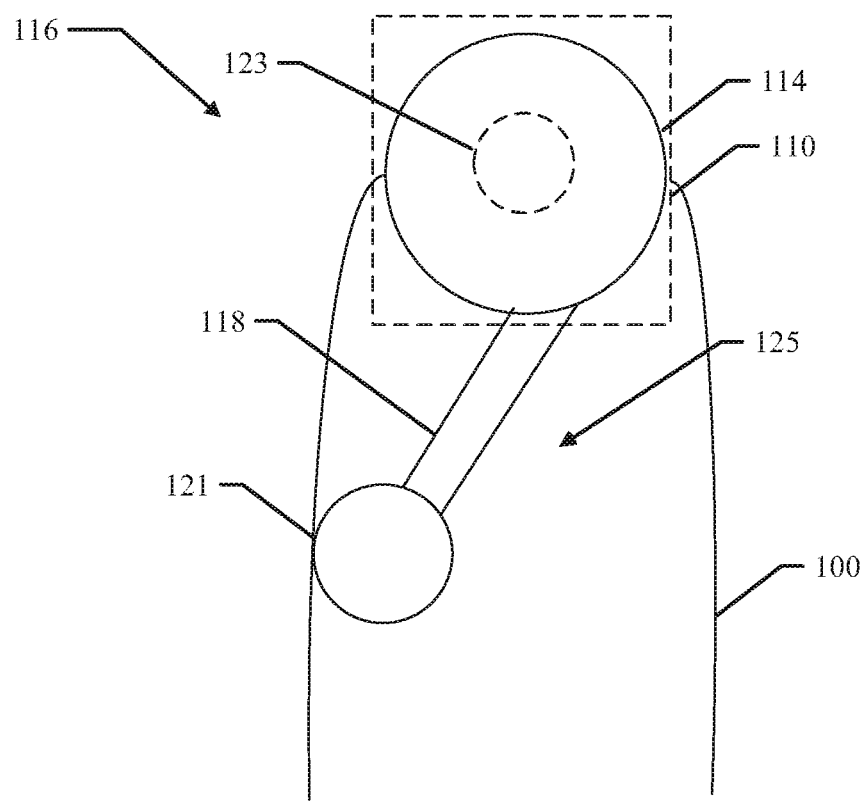
FIG. 4B illustrates a perspective view of a disengagement mechanism in a disengaged mode according to an example embodiment.

In some cases, the disengagement assembly 116 may further include a biasing mechanism 123 (See FIGS. 4A and 4B). The biasing mechanism 123 may be operably coupled between the front transmission 110 and the first end of the disengagement arm 118. The biasing mechanism 123 may be operable to exert a biasing force on the disengagement arm 118. If the flexible driving member 100 is tensioned, the biasing mechanism 123 may be overcome in response to urging the disengagement assembly 116 into the engaged position. When the flexible driving member 100 detensions, the biasing mechanism 123 may assist in urging the disengagement assembly 116 into the disengaged position. In an example embodiment, the biasing mechanism 123 may be a spring. In some cases, the spring may be a coiled spring.

Figure 3:
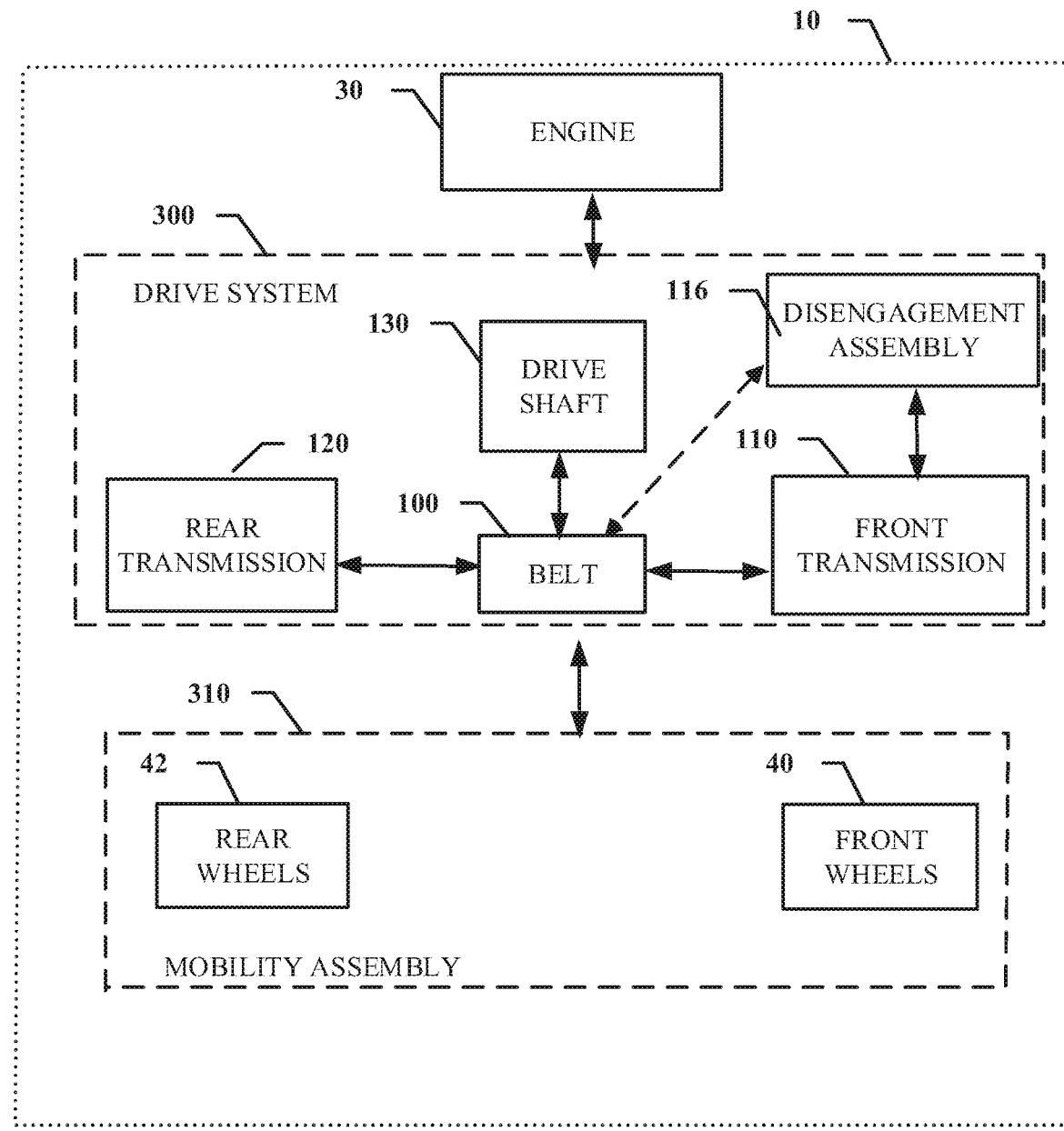
FIG. 3 illustrates a block diagram of a walk-behind lawn mower according to an example embodiment.

FIG. 3 illustrates a block diagram of a walk-behind lawn mower according to an example embodiment. As shown in FIG. 3, the engine may be operably coupled to a drive system 300 via the drive shaft 130 of the mower 10. The drive system 300 may include the front transmission 110, rear transmission 120, drive shaft 130, and flexible driving member 100 (not shown). The front transmission 110 and rear transmission 120 each may comprise a first drive pulley and second drive pulley, respectively.

The flexible driving member 100 may be operably coupled to the drive shaft 130, and selectively engage the front transmission 110 and the rear transmission 120. In other words, when the operator seeks to move the mower 10 in a forward direction and actuates the trigger control (or some other remote actuator) on the mower 10, the flexible driving member 100 may gain sufficient tension with respect to its engagement with the first drive pulley (see FIG. 2) and the second drive pulley (see FIG. 2). When the flexible driving member 100 gains sufficient tension, the rear transmission 120 and the front transmission 110 may be engaged, enabling the rear transmission 120 and the front transmission 110 to provide drive power to the rear wheels 42 and the front wheels 40, respectively, of the mobility assembly 310. Further, when the flexible driving member is tensioned, the disengagement assembly 116, which is operably coupled to the front transmission 110, may be rotated into an engaged position due to the flexible driving member 100 exerting force on the disengagement assembly 116. When drive power is provided to both the front wheels and rear wheels, the operator is assisted in moving the mower 10 in a forward direction.

When the operator seeks to move the mower 10 in a backwards direction, the operator may deactuate (or again actuate) the trigger control (or other remote actuator) of the mower 10 causing tension to be released from the flexible driving member 100. When tension is released from the flexible driving member 100, the rear transmission 120 may disengage. Further, when the flexible drive member 100 loses tension, the disengagement assembly 116 may be rotated or biased into a disengaged position due to the flexible driving member 100 exerting less pressure on the disengagement assembly 116. When the disengagement assembly 116 rotates into the disengaged position, the disengagement assembly 116 may interact with the front transmission 110 to transition the front transmission to a state in which the front transmission 110 becomes disengaged. When the front transmission 110 is disengaged, the front wheels 40 may rotate. When the front wheels can rotate, the operator may more easily move the mower 10 in a backwards direction. Thus, in an example embodiment, the disengagement assembly 116 may be configured to parasitically extract movement energy from the flexible driving member 100 as it transitions from the tensioned and the detensioned state to drive position changes in the disengagement assembly 116, or in other words, shifting the disengagement assembly 116 between the engaged and disengaged position. Accordingly, when the disengagement assembly 116 shifts to the engaged position, the front transmission 116 is engaged. When the disengagement assembly shifts to the disengaged position, the front transmission is effectively disengaged by the disengagement assembly 116.

Figure 5:
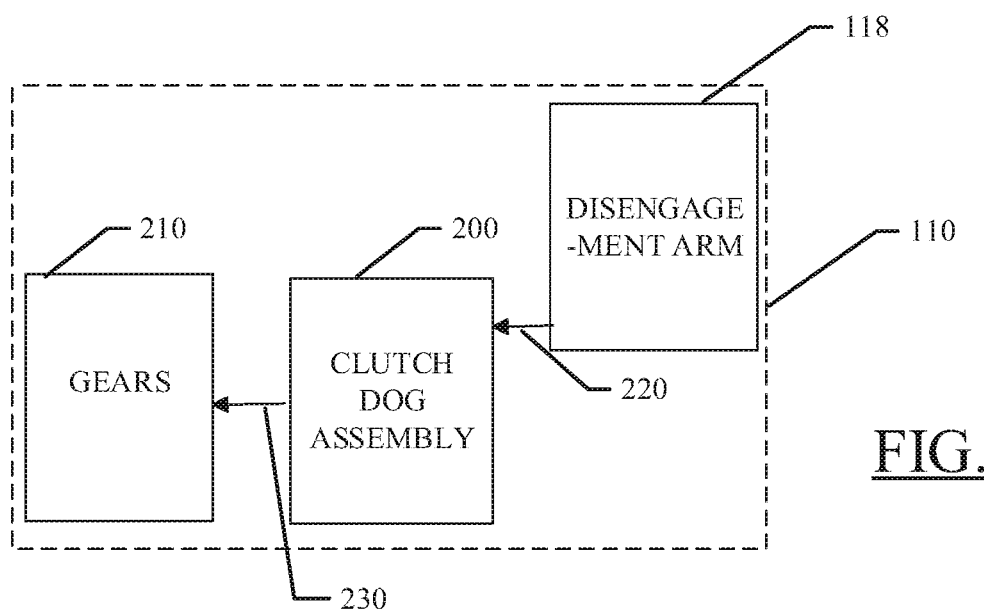
FIG. 5 illustrates a block diagram view of a disengagement mechanism of an example embodiment.

FIG. 4A-5 illustrate a perspective and block diagram view of the disengagement assembly 116 of example embodiments. As shown in FIG. 4A, the disengagement assembly 116, and more particularly the latching lever 125, is in an engaged position. As explained above, the disengagement assembly 116 may rotate into the engaged position when the flexible driving member 100 is tensioned against the force of the biasing mechanism 123 while the front transmission 110 provides drive power to the front wheels 40. In particular, once the flexible driving member 100 has sufficient tension with respect to its engagement with the first drive pulley 114 and the second drive pulley 124, the flexible driving member 100 will exert force against the latching lever 125 of the disengagement assembly 116 rotating the latching lever 125 into the engaged position. In an example embodiment, the flexible driving member 100 will exert force on the rotatable idler pulley 121 of the latching lever 125 which will then rotate causing the disengagement arm 118 of the latching lever 125 to pivot to the engaged position while the front transmission 110 is engaged. As shown in FIG. 5, in some cases, the disengagement arm 118 may rotate to engage an internal clutch dog assembly 200 of the front transmission 110. When the disengagement arm 118 rotates, as shown by arrow 220, to engage the internal clutch dog assembly 200, the internal clutch dog assembly 200 moves, as shown by arrow 230, to engage gears 210 of the front transmission. When the gears 210 are engaged, the front transmission is in an engaged mode. During the engaged mode, the front transmission 110 provides drive power to the front wheels 40 thereby assisting the operator in moving the mower 10 in a forward direction.

As shown in FIG. 4B, the disengagement assembly 116, and more particularly the latching lever 125, is in the disengaged position. As explained above, the disengagement assembly 116 may rotate into the disengaged position, allowing the front transmission 110 to disengage and thereby enabling the front wheels 40 to rotate. In particular, once the flexible driving member 100 loses sufficient tension with respect to its engagement with the first drive pulley 114 and the second drive pulley 124, the flexible driving member 100 will provide less force against the latching lever 125 causing the latching lever 125 to rotate to the disengaged position. In an example embodiment, the flexible driving will provide less force against the rotatable idler pulley 121 of the latching lever 125. The rotatable idler pulley 121 will rotate responsive to release of the force built up in the biasing mechanism 123 and cause the disengagement arm 118 of the latching lever 125 to pivot into the disengaged position. When the disengagement arm 118 is the disengaged position and the clutch dog assembly 200 of the front transmission 110 disengages from the gears 210, the front transmission 110 is in a disengaged mode. During the disengaged mode, the front transmission 110 is disengaged and the front wheels may rotate 40. When the front wheels 40 are rotatable, it is easier for the operator to pull the mower 10 in a backwards direction.

The rotatable idler pulley 121, as show in FIGS. 4A and 4B, may either rotate in a clockwise or counterclockwise position to rotate or pivot the disengagement arm 118. When the rotatable idler pulley 121 rotates, the disengagement arm 118 is rotated or pivoted into an engaged or disengaged position, depending on whether the flexible driving member 100 is tensioning or detensioning. The disengagement arm 118 of a longer pre-determined length may pivot or rotate into the engaged and disengaged position with minimal rotation needed by the rotatable idler pulley 121. If the disengagement arm 118 is a shorter pre-determined length, the rotatable idler pulley 121 may have to rotate to a greater extent to pivot or rotate the disengagement arm 118 into the engaged and disengaged position in comparison to the disengagement arm 118 with a longer pre-determined length. Depending on the length of the disengagement arm 118 and the type of front transmission 110, the disengagement assembly 116 may rotate between 5-30 degrees to engage and disengage the front transmission 110.

Figure 6:
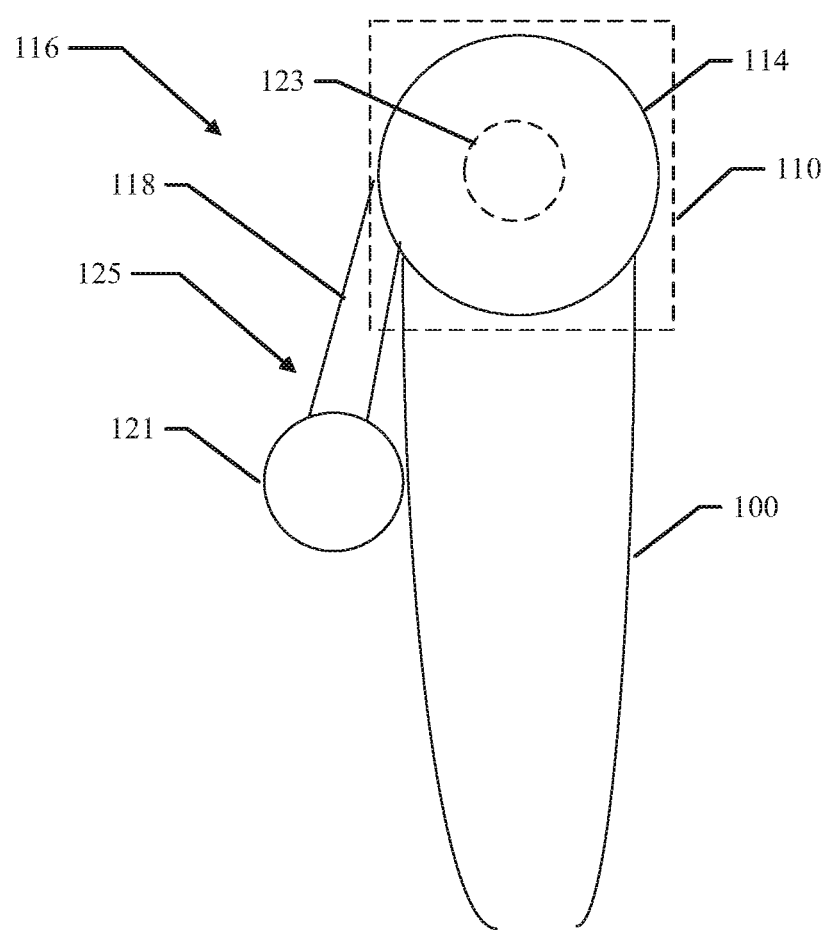
FIG. 6 illustrates a perspective view of a disengagement mechanism of a further example embodiment.

As further shown in FIGS. 4A and 4B, the disengagement assembly 116 may be located inside the flexible driving member 100. However, the disengagement assembly 116 may be located outside the flexible driving member 100. FIG. 6 illustrates a perspective view of a disengagement assembly 116 of a further example embodiment. As shown in FIG. bot, the disengagement assembly 116 may be located outside the flexible driving member 100. Regardless of whether the disengagement assembly 116 is located inside the flexible driving member 100 or outside the flexible driving member 100, the disengagement assembly 116 will still engage and disengage the front transmission 110 as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A lawn mower comprising:
a blade housing;
an engine operably coupled to the blade housing and configured to selectively rotate a drive shaft;
a mobility assembly selectively operably coupled to the engine to provide mobility of the lawn mower responsive at least in part to operation of the engine, wherein the mobility assembly comprises a first set of wheels; and
a drive system comprising:
a first transmission;
a flexible driving member; and
a disengagement assembly comprising a latching lever, wherein the latching lever is configured to switch the first transmission between a disengaged mode and an engaged mode, and wherein the latching lever is configured to move between a disengaged position corresponding to the disengaged mode and an engaged position corresponding to the engaged mode; and
a remote actuator operably coupled to the flexible driving member, wherein responsive to actuation of the remote actuator, the flexible driving member engages a) the latching lever to move the latching lever to the engaged position to thereby place the first transmission in the engaged mode; and b) the first transmission to provide drive power from the drive shaft to the first set of wheels.

2. The lawn mower of claim 1, wherein the mobility assembly further comprises a second set of wheels; and
wherein the drive system further comprises a second transmission; and
wherein, responsive to actuation of the remote actuator, the flexible driving member engages the second transmission to provide drive power from the drive shaft to the second set of wheels.

3. The lawn mower of claim 1, wherein the flexible driving member engages the latching lever responsive to tensioning of the flexible driving member.

4. The lawn mower of claim 1, wherein, when the latching lever moves to the engaged position, the latching lever engages an internal clutch dog assembly of the first transmission to thereby place the first transmission in the engaged mode.

5. The lawn mower of claim 1, wherein, responsive to deactuation of the remote actuator, the latching lever is biased to the disengaged position to thereby place the first transmission in the disengaged mode.

6. The lawn mower of claim 5, wherein the first set of wheels rotate when the first transmission is in the disengaged mode.

7. The lawn mower of claim 5, wherein the latching lever is biased to the disengaged position responsive to detensioning of the flexible driving member.

8. The lawn mower of claim 5, wherein, when the latching lever is biased to the disengaged position, the latching lever disengages an internal clutch dog assembly of the first transmission to thereby place the first transmission in the disengaged mode.

9. The lawn mower of claim 1, wherein the latching lever comprises a disengagement arm and a rotatable idler pulley.

10. The lawn mower of claim 1, wherein an inside of the flexible driving member engages the latching lever.

11. The lawn mower of claim 1, wherein an outside of the flexible driving member engages the latching lever.

12. The lawn mower of claim 1, wherein the flexible driving member engages the latching lever to move the latching lever between 5 and 30 degrees to the engaged position.

13. A drive system comprising:
a first transmission;
a flexible driving member; and
a disengagement assembly comprising a latching lever, wherein the latching lever is configured to switch the first transmission between a disengaged mode and an engaged mode, and wherein the latching lever is configured to move between a disengaged position corresponding to the disengaged mode and an engaged position corresponding to the engaged mode; and
a remote actuator operably coupled to the flexible driving member, wherein responsive to actuation of the remote actuator, the flexible driving member engages a) the latching lever to move the latching lever to the engaged position to thereby place the first transmission in the engaged mode; and b) the first transmission to provide drive power from a drive shaft to a first set of wheels.

14. The drive system of claim 13, wherein the drive system further comprises a second transmission; and
wherein, responsive to actuation of the remote actuator, the flexible driving member engages the second transmission to provide drive power from the drive shaft to a second set of wheels.

15. The drive system of claim 13, wherein the flexible driving member engages the latching lever responsive to tensioning of the flexible driving member, or
wherein, responsive to deactuation of the remote actuator, the latching lever is biased to the disengaged position to thereby place the first transmission in the disengaged mode.

16. The drive system of claim 13, wherein, when the latching lever moves to the engaged position, the latching lever engages an internal clutch dog assembly of the first transmission to thereby place the first transmission in the engaged mode.

17. The drive system of claim 13, wherein, responsive to deactuation of the remote actuator, the latching lever is biased to the disengaged position to thereby place the first transmission in the disengaged mode.

18. The drive system of claim 17, wherein the first set of wheels rotate when the first transmission is in the disengaged mode,
wherein the latching lever is biased to the disengaged position responsive to detensioning of the flexible driving member, or
wherein, when the latching lever is biased to the disengaged position, the latching lever disengages an internal clutch dog assembly of the first transmission to thereby place the first transmission in the disengaged mode.

19. The drive system of claim 13, wherein the latching lever comprises a disengagement arm and a rotatable idler pulley,
wherein an inside of the flexible driving member engages the latching lever, or
wherein an outside of the flexible driving member engages the latching lever.

20. The drive system of claim 13, wherein the flexible driving member engages the latching lever to move the latching lever between 5 and 30 degrees to the engaged position.

* * * * *